Oct. 22, 1963    R. W. HIPPEN ETAL    3,107,527
METERING AND SAMPLING APPARATUS FOR FLUIDS
Filed Jan. 19, 1961    2 Sheets-Sheet 1

Ralph W. Hippen
Clayton L. Murphy
INVENTORS
BY Charles E. Lightfoot
ATTORNEY.

Ralph W. Hippen
Clayton L. Murphy
INVENTORS

BY Charles E. Lightfoot

ATTORNEY

United States Patent Office 3,107,527
Patented Oct. 22, 1963

3,107,527
METERING AND SAMPLING APPARATUS FOR FLUIDS
Ralph W. Hippen, 1520 Welch St., Houston, Tex., and Clayton L. Murphy, 8028 Barkley Drive, Houston 17, Tex.
Filed Jan. 19, 1961, Ser. No. 83,686
3 Claims. (Cl. 73—198)

This invention relates to the metering and sampling of fluids and more particularly to apparatus for accurately metering a flowing liquid and collecting representative samples of the same during such metering.

The invention is capable of wide application for the metering and sampling of fluids and finds particular utility in connection with the accurate measurement and sampling of liquids flowing through closed conductors such as pipe lines.

The invention has for an important object the provision of metering apparatus for the accurate measurement of the flow of fluid in a system in which it is desirable to avoid any substantial interference with such flow.

Another object of the invention is to provide metering apparatus which is designed to permit the continuance of the flow of fluid in the event that the apparatus should fail to operate.

A further object of the invention is the provision of metering apparatus for fluids in which the working parts are assembled in a manner to permit the removal and replacement of the same as a unit.

Another object of the invention is to provide combined fluid metering and sampling apparatus for simultaneously continuously and accurately measuring a flowing fluid and taking representative samples of the same.

A still further object of the invention is to provide fluid metering and sampling apparatus which is of simple design and rugged construction, in which the parts are easily replaceable for purposes of maintenance and repair, and which is of economical manufacture.

The above and other important objects and advantages of the invention may best be understood from the following detailed description, constituting a specification of the same, when considered in conjunction with the annexed drawings, wherein—

Figure 1:
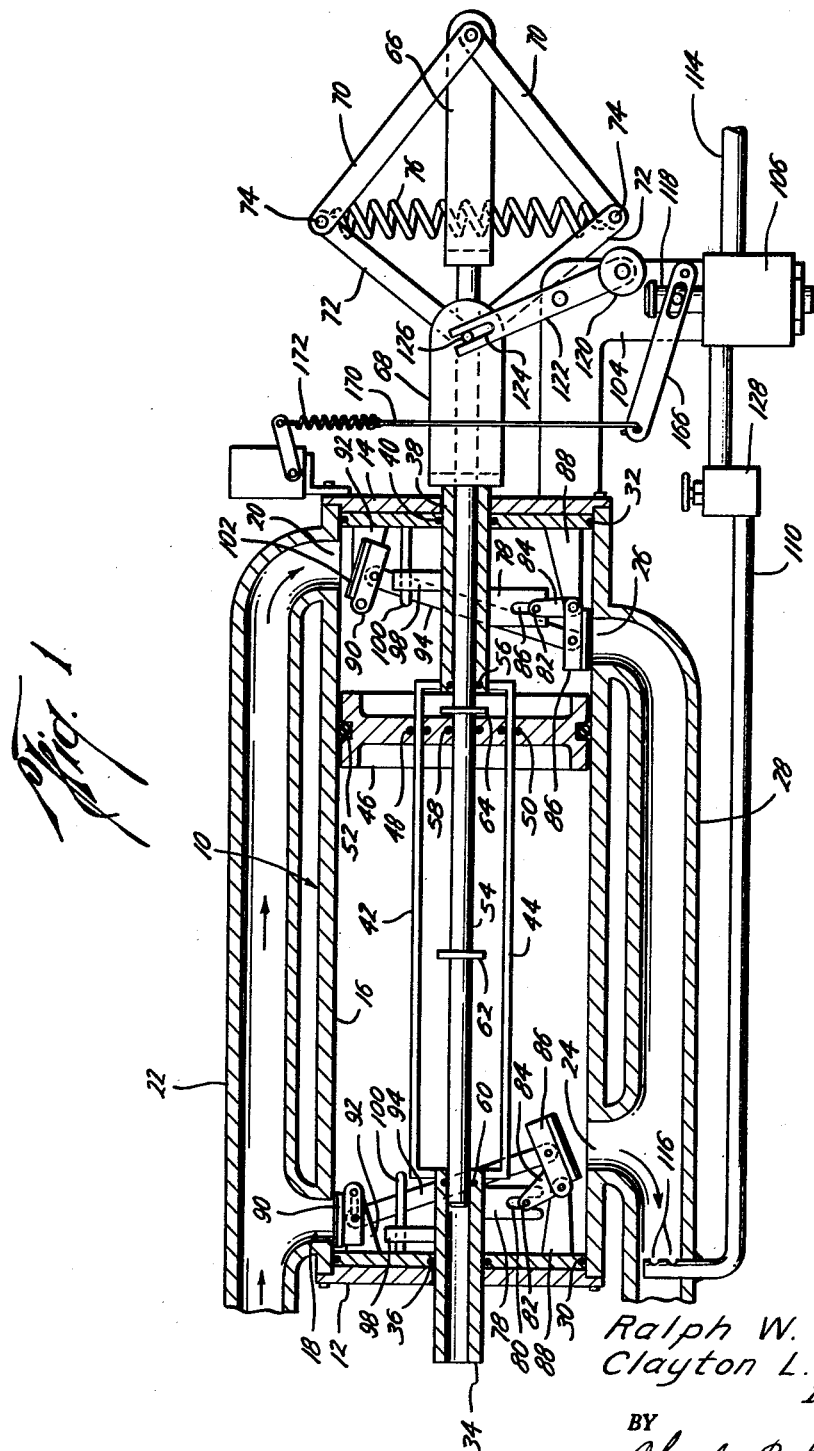
FIGURE 1 is a fragmentary, longitudinal, central, cross-sectional view, illustrating the preferred embodiment of the invention, showing the relative positions of the working parts of the apparatus at one stage of operation.

Referring now to the drawings in greater detail, the metering and sampling apparatus of the invention includes a cylindrical body 10 provided at its opposite ends with closure members 12 and 14 providing a metering chamber 16 into and out of which the fluid to be needed may flow. The body 10 is provided with longitudinally spaced inlet ports 18 and 20, through which fluid may flow into the chamber 16 through an intake manifold 22, and outlet ports 24 and 26 through which fluid may flow out of the chamber through a discharge manifold 28.

The closures 12 and 14 are provided with suitable means, such as the O-rings 30 and 32, positioned for sealing engagement with the closures and body 10 to prevent leakage of fluid from the chamber 16 when the closures are in place on the body. The closure 12 has a central opening therethrough, through which an elongated, tubular valve stem 34 is slidably extended, suitable packing means, such as the O-ring 36 being provided in the opening to prevent leakage of fluid from the chamber past the valve stem. The closure 14 is similarly provided with a central opening through which an elongated, tubular, valve stem 38 is slidably extended, suitable means, such as the O-ring 40 being provided in the opening.

Valve stems 34 and 38 are connected together at their inner ends by means of spaced apart, parallel, guide rods 42 and 44, to cause simultaneous longitudinal movement of the valve stems.

Within the chamber 16, a piston 46 is movably disposed on the guide rods 42 and 44, which are slidably extended through the piston, through suitable openings therein, suitable means, such as the packing rings 48 and 50 being provided, surrounding the guide rods to form a fluid tight seal between the rods and piston, and the piston also being provided with suitable packing such as the O-ring 52, positioned in an external groove in the piston, in position to form a fluid tight seal between the piston and the internal wall of the chamber.

An actuating shaft 54 is slidably extended through the valve stem 38, piston 46, and into the valve stem 34, suitable packing for the same, such as the O-rings 56, 58 and 60 being provided to close the valve stems 38 and 34 and the piston 46 against the flow of fluid therethrough. The actuating shaft 54 has longitudinally spaced, external stop members 62 and 64 positioned thereon at locations for engagement by the piston 46, to permit the piston to have limited longitudinal movement on the shaft, and to cause the shaft to move with the piston in either direction after such limited movement.

Figures 2, 3, 4:
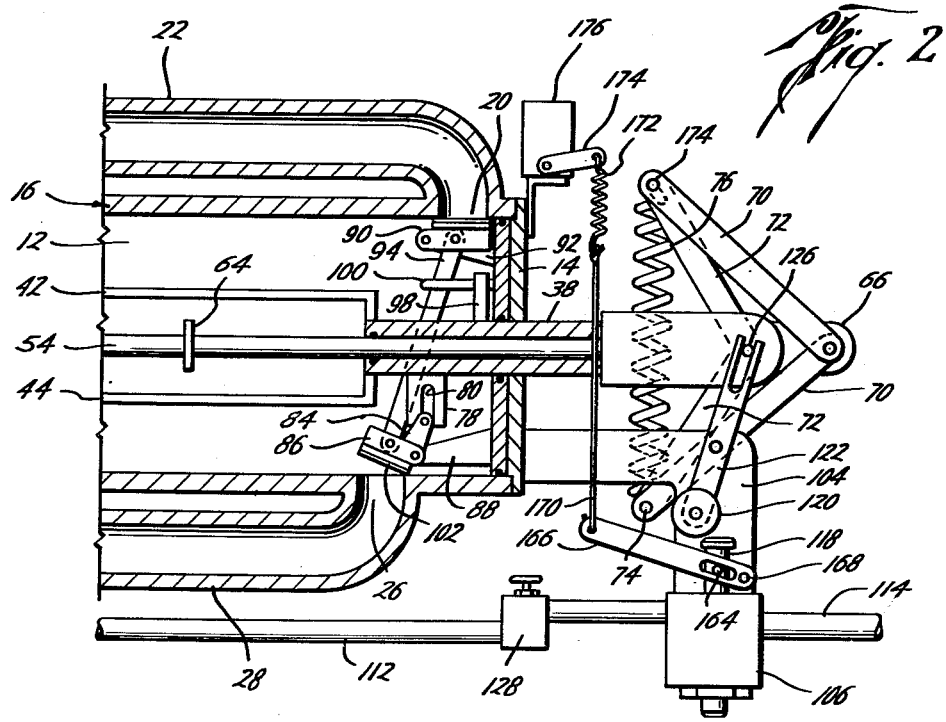
FIGURE 2 is a fragmentary view similar to that of FIGURE 1, showing the relative positions of the parts of the apparatus in another stage of operation of same.
FIGURE 3 is a fragmentary, top plan view of the valve actuating and sample taking mechanism of the invention, as illustrated in FIGURE 2.
FIGURE 4 is a fragmentary, longitudinal, cross-sectional view, on an enlarged scale, showing details of construction of the valve of the sample taking mechanism of the invention.

The outer end of the shaft 54 is connected to an inner yoke member 66, which moves longitudinally with the shaft, and an outer yoke member 68 is connected to the outer end of the valve stem 38 for longitudinal movement therewith. The arms of the outer yoke 68 are spaced apart a greater distance than the arms of the inner yoke 66, so that the inner yoke may move into the outer yoke, as illustrated in FIGURE 3 of the drawings. The inner and outer yokes 66 and 68 are connected together by pairs of links 70 and 72, the pair of links 70 being pivotally connected at one end to the yoke 66, and the pair of links 72 being pivotally connected at one end to the yoke 68, while the other ends of the pairs of links are pivotally connected together as indicated at 74, to form a pantograph-like linkage mechanism, the pivotally connected ends of the pairs of links are also connected together by a coiled spring 76.

Each of the valve stems 34 and 38 carries a lug 78, located inside of the chamber 16, and which has a slot 80 therein, which is open at the outer end of the link, within which a pin 82 on the end of a lug 84 is slidably movable, the lug 84 being attached to a valve 86, pivotally mounted on a lug 88 attached to one of the closures 12 and 14 to support the valve for movement into and out of closing relation to one of the discharge ports 24 and 26. Similar valves 90 are pivotally supported on lugs 92, similarly attached to the closures 12 and 14 in position for swinging movement into and out of closing relation to the intake ports 18 and 20. The inlet valve 90 and discharge valve 86 at each end of the chamber 16 are pivotally connected together by a link 94, in a manner to cause the inlet valve at one end of the cylinder to open as the discharge valve at that end closes, while the inlet valve at the other end of the chamber will close as the discharge valve at the other end opens.

Each of the valve stems 34 and 38 is also provided with a perforated lug 98, through which a pin 100 attached to the adjacent closure is slidably extended to hold the valve stem and the valve assembly associated therewith against rotation in the chamber.

The valves 86 and 90 are preferably curved to conform to the internal curvature of the chamber 16 and may each have a facing 102 of suitable material, such as rubber, or the like, positioned for engagement with the internal face of the body 10 about the valve port, to effectively close the port when the valve is moved to closed position.

In the operation of the meter, assuming that the parts are in the position illustrated in FIGURE 1, with the intake valve at one end of the chamber open and the discharge valve at the other end of the chamber open, fluid may flow through the intake manifold 22 into the one end of the chamber 16 on one side of the piston 46, to move the piston toward the other end of the chamber, while at the same time, fluid may flow out of the chamber from the other side of the piston through the discharge manifold 28. When the piston has moved into engagement with the stop 62 of the actuating shaft 54, the shaft will thereafter be moved with the piston toward the other end of the chamber. Upon movement of the shaft 54 with the piston 46 to the left in FIGURE 1, the inner yoke 66 will be moved to the left, while the outer yoke 68 will be held against movement to the left by the inlet and discharge valves which are in closed position, the spring 76 being further extended until the longitudinal axis of the spring passes the pivotal point 73 of attachment of the links 72 to the outer yoke 68. Whereupon, the outer yoke will be suddenly moved to the right from the position of FIGURE 1 to the position of FIGURE 2 to move the valve stems 34 and 38 to the right, to actuate the valves to simultaneously open the inlet valve and close the discharge valve at the left end of the chamber 16 and to simultaneously close the inlet valve and open the discharge valve at the right end of the chamber. Upon such reversal of the valves, as illustrated in FIGURE 2, fluid from the intake manifold 22 may flow into the chamber 16 at the left side of the piston 46, while fluid may flow out of the chamber 16 from the right side of the piston 46, to cause the piston to move toward the right. When the piston has moved to the right, a sufficient distance to engage the stop 64 of the shaft 54, the shaft will then move with the piston to the right to move the inner yoke out of the outer yoke until the axis of the spring 76 is moved to the right past the pivot point 73 at which the links 72 are connected to the outer yoke, whereupon the outer yoke will be suddenly moved to the left to again return the valves to the position of FIGURE 1.

The closure 14 has an external bracket 104, of angle shape, upon whose outer end a valve 106 of the sample taking mechanism is mounted, which valve has an inlet 108 to which a sample intake line 110 is connected, and an outlet 112 to which a sample discharge line 114 is connected. The sample intake line 110 extends into the discharge manifold 28 and is provided therein with suitable inlet openings 116 through which fluid may enter the intake line. The sample taker valve 106 has a slidable plunger 118, which is positioned to be engaged by a roller 120 carried on a pivoted lever 122, attached to the bracket 104, to depress the plunger upon swinging movement of the lever. The lever 122 has a slot 124 in its upper end within which a pin 126 on the outer yoke 68 is slidably extended to rotate the lever about its pivot as the outer yoke moves back and forth.

A manually operated control valve 128 may be positioned in the sample inlet line 110 by which this line may be closed when desired.

The valve 106 of the sample taker mechanism has a hollow casing, into whose lower end a screw plug 130 is threadably inserted, suitable means such as the O-ring 132 being provided, positioned for sealing engagement with the plug and housing to prevent leakage of fluid from the interior of the housing past the plug. The plug 130 has a central opening 134 through which the plunger 118 is slidably extended, and a sealing element such as the O-ring 136 is positioned in the central opening to form a fluid tight seal with the plunger and plug. The plug 130 also has a counterbore 138 at its inner end, into which a movable valve element 140 is slidably extended, which valve element is provided with a seal forming member, such as the O-ring 142, positioned for sealing engagement with the valve element and the internal surface of the counterbore 138. The interior of the housing also has an inlet counterbore 144, which opens into an outlet chamber 146 of somewhat larger diameter than the counterbore 144 to form an internal annular shoulder 148 to provide a valve seat located between the inlet and outlet passageways of the housing. The valve element 140 has a longitudinal bore 150 therethrough, which is of somewhat larger diameter than the external diameter of the plunger 118 and the valve element carries at its upper end a sealing element 152, such as an O-ring, or the like, positioned for engagement with the valve seat 148, when the valve is in closed condition.

A coiled spring 153 is positioned in the counterbore 138 beneath the valve element 140, in position to yieldingly urge the valve element toward closed position, and suitable means such as the pins 156 and 158 are carried by the plunger 118 in position for engagement with the valve element 140 to cause the valve element to move in either direction with the plunger. The plunger 118 extends upwardly through the top of the valve casing and is surrounded by a sealing element or O-ring 160 which forms a fluid tight seal between the plunger and the top of the casing.

The plunger 118 has an external pin 162, located outside of the valve casing, and which is positioned to extend into an elongated slot 164 in a lever arm 166 pivotally secured at one end to the bracket 104, as indicated at 168, and whose other end is connected by a link 170 to a coil spring 172, which is in turn connected to the lever arm 174 of a suitable counter 176, mounted on the closure 114. By this arrangement, the lever 166 will be moved downwardly about the pivot 168 each time that the plunger 118 is depressed to actuate the counter 176 to record the number of movements of the piston 46 in the meter chamber 16 to indicate the volume of fluid which flows through the meter.

It will be apparent that fluid from the inlet 118 of the sample taking valve may pass downwardly between the valve element 140 and the plunger 118 into the counterbore 138 of the plug 130, and the diameter of the counterbores 144 and 138 may be substantially the same, so that the pressure on both sides of the valve will be substantially balanced, and a relatively light spring 154 may be used to hold the valve element closed.

The sample taking valve is shown in FIGURE 4 in its closed position, and it will be apparent that upon actuation of the meter, the roller 120 will engage the upper end of the plunger 118 to depress the plunger each time that the chamber 16 is filled, such depression of the plunger moving the valve element 140 and seal 152 downwardly away from the seat 148 to allow a sample of the fluid to pass from the inlet line 110 to the discharge line 114. The discharge line 114 may lead to any desired location for collection of the samples.

In the event that it should become necessary to replace the working parts of the meter or to make repairs to the same, this may be accomplished by removing the closures 12 and 14, whereupon the entire assembly of working parts may be removed from the body 10 and replaced by a new assembly.

It will thus be seen that the invention, constructed and arranged as described above provides a metering and sampling apparatus which is of simple design and rugged construction, which may be accurately calibrated and in which the parts are easily removed and replaced for purposes of maintenance and repair.

The invention is disclosed herein in connection with a certain specific embodiment of the same, but it will be understood that this is intended by way of illustration only and that various changes can be made in the construction and arrangement of the parts, within the spirit of the invention and the scope of the appended claims.

Having thus clearly shown and described the invention, what is claimed as new and desired to secure by Letters Patent is:

1. In fluid metering and sample taking apparatus the combination with a cylinder, a reciprocating piston in the cylinder, an inlet and an outlet port in the cylinder on each side of the piston, a valve in the cylinder for each port and means positioned for coaction with the piston and valves to open the inlet port and close the outlet port on one side of the piston and close the inlet port and open the outlet port on the other side of the piston upon movement of the piston in one direction and to reverse the positions of the valves on the opposite sides of the piston upon movement of the piston in the other direction, or a sample pipe connected in communication with a source of fluid to be sampled, valve means in the sample pipe for controlling the outflow of fluid therethrough and means positioned for coaction with said piston and valve means to open and close the valve means upon movement of the piston in either direction.

2. In fluid metering and sample taking apparatus the combination with a cylinder, a reciprocating piston in the cylinder, an inlet and an outlet port in the cylinder on each side of the piston, a valve in the cylinder for each port and means positioned for coaction with the piston and valves to open the inlet port and close the outlet port on one side of the piston and close the inlet port and open the outlet port on the other side of the piston upon movement of the piston in one direction and to reverse the positions of the valves on the opposite sides of the piston upon movement of the piston in the other direction, of a sample pipe connected in communication with a source of fluid to be sampled, valve means in the sample pipe for controlling the outflow of fluid therethrough and means positioned for coaction with the piston and valve means for opening and closing said valve means upon reversal of the positions of the valves on opposite sides of the piston.

3. In fluid metering and sample taking apparatus the combination with a cylinder, a reciprocating piston in the cylinder, an inlet and an outlet port in the cylinder on each side of the piston, a valve in the cylinder for each port and means positioned for coaction with the piston and valves to open the inlet port and close the outlet port on one side of the piston and close the inlet port and open the outlet port on the other side of the piston upon movement of the piston in one direction and to reverse the positions of the valves on the opposite sides of the piston upon movement of the piston in the other direction, of a sample pipe connected in communication with a source of fluid to be sampled, valve means in the sample pipe for controlling the outflow of fluid therethrough and means positioned for coaction with said valves and said valve means for causing said valve means to open and close upon reversal of the positions of the valves on either side of the piston.

References Cited in the file of this patent
UNITED STATES PATENTS

| | | |
|---|---|---|
| 1,534,238 | Mercer | Apr. 21, 1925 |
| 1,586,834 | Ormsby | June 1, 1926 |
| 1,886,364 | Bassler | Nov. 8, 1932 |
| 2,217,855 | Bassler | Oct. 15, 1940 |
| 2,906,126 | Brown | Sept. 29, 1959 |
| 2,982,134 | Brown | May 2, 1961 |